(12) United States Patent
Lu et al.

(10) Patent No.: US 7,767,728 B2
(45) Date of Patent: *Aug. 3, 2010

(54) CURABLE COMPOSITIONS FOR OPTICAL ARTICLES

(75) Inventors: Ying-Yuh Lu, Woodbury, MN (US); Jianhui Xia, Woodbury, MN (US); Peter M. Olofson, Oakdale, MN (US); Ming Cheng, Woodbury, MN (US); Mark F. Ellis, St. Paul, MN (US); Babu N. Gaddam, Woodbury, MN (US); Kevin M. Lewandowski, Inver Grove Heights, MN (US); Joseph D. Rule, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/279,236

(22) PCT Filed: Jan. 29, 2007

(86) PCT No.: PCT/US2007/002397

§ 371 (c)(1), (2), (4) Date: Aug. 13, 2008

(87) PCT Pub. No.: WO2007/094953

PCT Pub. Date: Aug. 23, 2007

(65) Prior Publication Data

US 2009/0156747 A1 Jun. 18, 2009

(51) Int. Cl.
*C08F 2/50* (2006.01)
*C08J 3/28* (2006.01)
*C09K 19/00* (2006.01)

(52) U.S. Cl. ........................ 522/120; 522/113; 522/114; 522/121; 522/149; 522/150; 522/153; 522/178; 522/182; 428/1.1; 264/1.1; 264/1.38

(58) Field of Classification Search ................ 522/113, 522/114, 120, 121, 149, 150, 153, 178, 182; 428/1.1; 264/1.1, 1.38
See application file for complete search history.

(56) References Cited

U.S. PATENT DOCUMENTS

| | | | |
|---|---|---|---|
| 4,542,449 A | 9/1985 | Whitehead | |
| 4,568,445 A | 2/1986 | Cates et al. | |
| 4,721,377 A | 1/1988 | Fukuda et al. | |
| 4,795,823 A | 1/1989 | Schmitt et al. | |
| 4,812,032 A | 3/1989 | Fukuda et al. | |
| 5,175,030 A | 12/1992 | Lu et al. | |
| 5,183,597 A | 2/1993 | Lu | |
| 5,274,063 A * | 12/1993 | Matsumoto et al. | ......... 526/320 |
| 5,394,255 A | 2/1995 | Yokota et al. | |
| 5,424,339 A | 6/1995 | Zanka et al. | |
| 5,591,527 A | 1/1997 | Lu | |
| 5,650,215 A | 7/1997 | Mazurek et al. | |
| 5,741,543 A * | 4/1998 | Winslow et al. | ........... 427/208.4 |
| 5,753,768 A | 5/1998 | Ellis | |
| 5,882,774 A | 3/1999 | Jonza et al. | |
| 5,986,011 A | 11/1999 | Ellis | |
| 6,123,890 A | 9/2000 | Mazurek et al. | |
| 6,315,851 B1 | 11/2001 | Mazurek et al. | |
| 6,440,880 B2 | 8/2002 | Mazurek et al. | |
| 6,609,795 B2 | 8/2003 | Weber et al. | |
| 6,664,306 B2 | 12/2003 | Gaddam et al. | |
| 6,719,426 B2 | 4/2004 | Magarill et al. | |
| 6,733,700 B2 * | 5/2004 | Houston et al. | ............... 264/1.1 |
| 6,749,779 B2 * | 6/2004 | Soane et al. | ................. 264/1.1 |
| 6,838,150 B2 | 1/2005 | Mazurek et al. | |
| 6,874,885 B2 * | 4/2005 | Soane et al. | ................. 351/159 |
| 2004/0202879 A1 | 10/2004 | Xia et al. | |
| 2007/0021521 A1 * | 1/2007 | Cheng et al. | .................... 522/1 |
| 2007/0188864 A1 * | 8/2007 | Duncan et al. | .............. 359/495 |
| 2008/0058381 A1 * | 3/2008 | Piot-Grosjean et al. | ..... 514/326 |

FOREIGN PATENT DOCUMENTS

| | | |
|---|---|---|
| EP | 1375617 | 1/2004 |
| GB | 1567080 | 5/1980 |
| WO | WO 98/49723 | 11/1998 |
| WO | WO 02/20625 | 3/2002 |
| WO | WO 2007/015815 | 2/2007 |

OTHER PUBLICATIONS

F.E. Doany et al., "Projection display throughput: Efficiency of optical transmission and light-source collection," IBM J. Res. Develop., vol. 42, No. 3/4, May/Jul. 1998, pp. 387-399.

A.E. Rosenbluth et al., "Contrast properties of reflective liquid crystal light valves in projection displays," IBM J. Res. Develop., vol. 42, No. 3/4, May/Jul. 1998, pp. 359-386.

(Continued)

*Primary Examiner*—Sanza L McClendon
(74) *Attorney, Agent, or Firm*—Kent S. Kokko (57) ABSTRACT

A curable composition is provided comprising an oligomer having a plurality of pendent and/or terminal ethylenically unsaturated, free-radically polymerizable functional groups, a free-radically polymerizable crosslinking agent, and/or a diluent monomer, and a photoinitiator. The composition, when cured, is non-yellowing, exhibits low shrinkage and low birefringence making it suitable for many optical applications such as optical lenses, optical fibers, prisms, light guides, optical adhesives, and optical films.

18 Claims, 1 Drawing Sheet

OTHER PUBLICATIONS

L.H. Sperling, "Effect of Copolymerization on $T_g$," Introduction to Physical Polymer Science, $2^{nd}$ Edition, John Wiley & Sons, New York, p. 357 (1992).

Schnabel et al., "Study on Polarizing Visible Light by Subwavelength-Period Metal-Stripe Gratings", Optical Engineering, vol. 38, No. 2, pp. 220-226, Feb. 1999.

H.J. Lee et al., "Crosslinkable Polymers for Optical Waveguide Devices. II. Fluorinated Ether Ketone Oligomers Bearing Ethynyl Group at the Chain End", Journal of Polymer Science Part A: Polymer Chemistry, vol. 37, No. 14, pp. 2355-2361, Jan. 21, 2000.

PCT International Search Report, PCT/US2007/002397, Feb. 8, 2007.

Supplementary European Search Report, EP Application No. 07 71 7108, Nov. 20, 2009.

* cited by examiner

CURABLE COMPOSITIONS FOR OPTICAL ARTICLES

CROSS REFERENCE TO RELATED APPLICATIONS

This application is a national stage filing under 35 U.S.C. 371 of PCT/US2007/002397, filed Jan. 29, 2007, which claims priority to U.S. Ser. No. 11/276,068, filed Feb. 13, 2006, the disclosure of which is incorporated by reference in its/their entirety herein.

FIELD OF THE INVENTION

The present invention provides curable compositions containing (meth)acryloyl oligomers that are readily polymerized to produce optical articles and coatings.

BACKGROUND OF THE INVENTION

Optical materials and optical products are useful to control the flow and intensity of light. Examples of useful optical products include optical lenses such as Fresnel lenses, prisms, optical light fibers, light pipes, optical films including totally internal reflecting films, retroreflective sheeting, and microreplicated products such as brightness enhancement films and security products. Examples of some of these products are described in U.S. Pat. Nos. 4,542,449, 5,175,030, 5,591,527, 5,394,255, among others.

Polymeric materials have found a variety of uses in optical articles and are widely used in place of such articles made from ground glass because the former are light in weight and inexpensive to produce. Polycarbonates, for example, are characterized by excellent clarity, resistance to discoloration, high strength, and high impact resistance. However, thermal polymerization of monomers to form polymers is generally accompanied by high shrinkage during cure (e.g., from 11 to 20%) and extended curing time (e.g., from 5 to 16 hours or more). The high shrinkage levels create difficulties in the production of precision optics (such as lenses or prisms) from this material, particularly in the production of articles having larger thicknesses or large differences in thickness between the center and edges of the article. The extended cure times tie up production facilities and lead to inefficient utilization of the dies in which the articles are molded. Also, the thermal cure cycle used to polymerize the monomer consumes large amounts of energy and undesirably thermally stresses the dies.

Optical products can be prepared from high index of refraction materials, including monomers such as high index of refraction (meth)acrylate monomers, halogenated monomers, etc., and other such high index of refraction monomers that are known in the optical product art. See, e.g., U.S. Pat. Nos. 4,568,445, 4,721,377, 4,812,032, and 5,424,339. Some of these polymers may be advantageously injection molded, but such molding operations lead to high birefringence in the resulting article, and a subsequent annealing step may be required. Further, poly(methyl methacrylate) polymers tend to be moisture sensitive, and will swell on exposure to moisture or humidity, further leading to birefringence.

Several disclosures are related to optical coatings, which are generally less than two mils (50.8 micrometers) thick. They fail to describe if those compositions would have a desired balance of useful properties such as low polymerization shrinkage, low viscosity, absence of coloration, high hardness, resistance to stress cracking, moisture or humidity sensitivity and low birefringence necessary in the production of precision optical components such as lenses, including Fresnel lenses, and prisms. Additionally, they fail to teach how to obtain resins providing the desired balance of properties that are useful for providing cast precision optical articles. Moreover, many of the polymeric compositions generally have too high a viscosity to be useful for optical casting purposes.

SUMMARY OF THE INVENTION

The present invention includes a curable composition comprising a (meth)acryloyl oligomer having a plurality of pendent, ethylenically unsaturated, free-radically polymerizable functional groups, and having a $T_g \geq 20°$ C. (preferably having a $T_g \geq 50°$ C.); a free-radically polymerizable crosslinking agent and/or a diluent monomer; and a photoinitiator. The composition, when cured, is non-yellowing, exhibits low shrinkage and low birefringence and low sensitivity to moisture, making it suitable for many optical applications including, but not limited to optical lenses, optical fibers, prisms, diffractive lenses, microlenses, microlens arrays, Fresnel lenses, light guides, and optical films and coatings. The composition is low viscosity so that it may be used as an optical adhesive and in conventional molding operations, and build molecular weight by a chain-growth addition process. Further, articles may be prepared by cast and cured processes and thereby avoids birefringence induced by injection molding processes.

Generally, curable systems containing a significant amount of solvent, monomers and reactive diluents can give rise to a significant increase in density when transformed from the uncured to the cured state causing a net shrinkage in volume. As is well known, shrinkage can cause unpredictable registration in precise molding operations such as those required in manufacture of optical elements such as lenses. Shrinkage can also create residual stress in such optical articles, which can subsequently lead to optical defects, including high birefringence.

The present invention also provides shaped articles, including optical articles, and a method for preparing the same comprising, in one embodiment, the steps of:
  (1) mixing the components to form an optical casting composition,
  (2) optionally degassing the composition,
  (3) optionally heating the composition,
  (4) introducing the composition into a suitable mold, and
  (5) effecting polymerization, preferably photopolymerization, of the composition.

The present invention addresses the needs of the industry by providing a rapid cure, solvent free, curable composition, to produce thick precision optics such as optical lenses, light guides, prisms, etc., with low birefringence for applications in electronic displays, cameras, binoculars, fax machines, bar code scanners, and optical communication devices. The present invention is especially useful in preparing prisms such as those used in polarizing beam splitters (PBS's) used in optical imager systems and optical reader systems. The term "optical imager system" as used herein is meant to include a wide variety of optical systems that produce an image for a viewer to view. Optical imager systems of the present invention may be used, for example, in front and rear projection systems, projection displays, head-mounted displays, virtual viewers, heads-up displays, optical computing systems, optical correlation systems, and other optical viewing and display systems.

A PBS is an optical component that splits incident light rays into a first polarization component and a second polarization component. Traditional PBS's function based on the plane of incidence of the light, that is, a plane defined by the incident light ray and a normal to the polarizing surface. The plane of incidence also is referred to as the reflection plane, defined by the reflected light ray and a normal to the reflecting surface. Based on the operation of traditional polarizers, light has been described as having two polarization components, a p- and an s-component. The p-component corresponds to light polarized in the plane of incidence. The s-component corresponds to light polarized perpendicular to the plane of incidence.

To achieve the maximum possible efficiency in an optical imaging system, a low f/# system is desirable (see, F. E. Doany et al., Projection display throughput; Efficiency of optical transmission and light-source collection, IBM J. Res. Develop. V42, May/July 1998, pp. 387-398). The f/# measures the light gathering ability of an optical lens and is defined as:

f/#=f (focal length)÷D (diameter or clear aperture of the lens). The f/# (or F) measures the size of the cone of light that may be used to illuminate an optical element. The lower the f/#, the faster the lens and the larger the cone of light that may be used with that optical element. A larger cone of light generally translates to higher light throughput. Accordingly, a faster (lower f/#) illumination system requires a PBS able to accept light rays having a wider range of incident angles. The maximum incident angle $\Theta_{max}$ (the outer rays of the cone of light) may be mathematically derived from the f/#;

$$\Theta_{max} = \tan^{-1}((2F)^{-1})$$

Traditional folded light path optical imaging systems have employed an optical element know as a MacNeille polarizer. MacNeille polarizers take advantage of the fact that an angle exists, called Brewster's angle, at which no p-polarized light is reflected from an interface between two media of differing refractive index (n). Brewster's angle is given by:

$$\Theta_B = \tan^{-1}(n_1/n_0),$$

where $n_0$ is the refractive index of one medium, and $n_1$ is the refractive index of the other. When the angle of incidence of an incident light ray reaches the Brewster angle, the reflected beam portion is polarized in the plane perpendicular to the plane of incidence. The transmitted beam portion becomes preferentially (but not completely) polarized in the plane parallel to the plane of incidence. In order to achieve efficient reflection of s-polarized light, a MacNeille polarizer is constructed from multiple layers of thin films of materials meeting the Brewster angle condition for the desired angle. The film thicknesses are chosen such that the film layer pairs form a quarter wave stack.

There is an advantage to this construction in that the Brewster angle condition is not dependent on wavelength (except for dispersion in the materials). However, MacNeille polarizers have difficulty achieving wide-angle performance due to the fact that the Brewster angle condition for a pair of materials is strictly met at only one angle of incidence. As the angle of incidence deviates from this angle a spectrally non-uniform leak develops. This leak becomes especially severe as the angle of incidence on the film stack becomes more normal than the Brewster's angle. As will be explained below, there are also contrast disadvantages for a folded light path projector associated with the use of p and s-polarization, referenced to the plane of reflection for each ray.

Typically, MacNeille PBS's are contained in glass cubes, wherein a PBS thin-film stack is applied along a diagonal plane of the cube. By suitably selecting the index of the glass in the cube, the PBS may be constructed so that light incident normal to the face of the cube is incident at the Brewster angle of the PBS. However, the use of cubes gives rise to certain disadvantages, principally associated with the generation of thermal stress-induced birefringence that degrades the polarization performance of the component. Even expensive pre-annealed cubes may suffer from this difficulty. Also cubes add significant weight to a compact system.

MacNeille-type PBS's reportedly have been developed capable of discrimination between s- and p-polarized light at f/#'s as low as f/2.5, while providing extinction levels in excess of 100:1 between incident beams of pure s- or pure p-polarization. Unfortunately, as explained below, when MacNeille-type PBS's are used in a folded light path with reflective imagers, the contrast is degraded due to depolarization of rays of light having a reflection plane rotated relative to the reflection plane of the principal ray. As used below, the term "depolarization" is meant to describe the deviation of the polarization state of a light ray from that of the principal light ray. As light in a projection system generally is projected as a cone, most of the rays of light are not perfectly parallel to the principal light ray. The depolarization increases as the f/# decreases, and is magnified in subsequent reflections from color selective films. This "depolarization cascade" has been calculated by some optical imaging system designers to effectively limit the f/# of MacNeille PBS based projectors to about 3.3, thereby limiting the light throughput efficiency of these systems. See, A. E. Rosenbluth et al., Contrast properties of reflective liquid crystal light valves in projection displays, IBM J. Res. Develop. V42, May/July 1998, pp. 359-386.

As used herein:

"Actinic radiation" means photochemically active radiation and particle beams. Actinic radiation includes, but is not limited to, accelerated particles, for example, electron beams; and electromagnetic radiation; for example, microwaves, infrared radiation, visible light, ultraviolet light, X-rays, and gamma-rays. The radiation can be monochromatic or polychromatic, coherent or incoherent, and should be sufficiently intense to generate substantial numbers of free radicals in the actinic radiation curable compositions.

"(Meth)acryloyl groups" means both acryloyl and methacryloyl groups, and includes acrylate, methacrylate, acrylamide and methacrylamide groups.

"Ethylenically unsaturated groups" include, but are not limited to, vinyl, vinyloxy, (meth)acryloyl and the like.

"Melt processible" is used to refer to oligomer compositions that possess or achieve a suitable low viscosity for coating or molding at temperatures less than or equal to 100° C., using conventional molding or coating equipment.

"Photocuring" and "photopolymerization" are used interchangeably in this application to indicate an actinic radiation induced chemical reaction in which relatively simple molecules combine to form a chain or net-like macromolecule.

"100% solids" means a composition free of unreactive species, such as solvents.

"Transmittance" of radiant energy refers to the passage of radiant energy through a material.

"Transparency" may be considered as a degree of regular transmission, and thus the property of a material by which objects may be seen through a sheet thereof. A transparent material transmits light without significant diffusion or scattering.

DETAILED DESCRIPTION

The present invention provides curable materials comprising one or more (meth)acryloyl oligomers having a plurality of pendent, free-radically polymerizable functional groups, and having a $T_g \geq 20°$ C. (preferably a $T_g \geq 50°$ C.); a free-radically polymerizable crosslinking agent and/or a diluent monomer, and a photoinitiator. In many embodiments, the present invention provides curable materials with low shrinkage, residual stress and birefringence that is optically clear and non-yellowing for applications in precision optics and electronic displays.

The composition of the present invention minimizes shrinkage and birefringence due to optimum molecular weight of the (meth)acryloyl oligomer and loading of the crosslinker and/or reactive diluent. The low shrinkage compositions of this invention are particularly useful in molding applications or in any applications where accurate molding and/or registration is required. The present invention provides new compositions that may be formulated as 100% solids, cured by free-radical means and that exhibit properties that meet or exceed those of the art. The present invention provides compositions that exhibit less than 5% shrinkage, and preferably less than 3%. The compositions are low in viscosity and suitable for molding processes, including precision molding processes. The compositions generally have a viscosity less than 20,000 centipoise, less than 15,000 centipoise, or less than 10,000 centipoise at application temperatures of 100° C. or less. The compositions generally have a viscosity of at least 100 centipoise, or at least 500 centipoise at temperatures of 100° C. or less.

The articles of the invention may have a thickness greater than about 0.5 millimeters, generally a birefringence (absolute) of less than $1 \times 10^{-6}$, light transmission greater than about 85%, preferably greater than 90%, and a CIELAB b* less than about 1.5 units, preferably less than about 1.0 unit for samples with thickness of 4.8 millimeters.

The composition generally comprises:

50 to 99 parts by weight, preferably 60 to 95 parts and most preferably 70 to 95 parts of an oligomer having a plurality of pendent free-radically polymerizable functional groups and having a $T_g \geq 20°$ C., preferably $\geq 50°$ C.;

1 to 50 parts by weight, preferably 5 to 40 parts, and most preferably 5 to 30 parts of a free-radically polymerizable crosslinking agent and/or a diluent monomer;

and 0.001 to 5 parts be weight, preferably 0.001 to 1, most preferably 0.01 to 0.1 parts of a photoinitiator, based on 100 parts by weight of oligomer and crosslinking agent and/or reactive diluent monomer.

In some preferred embodiments, the crosslinking agent comprises 1 to 40 parts by weight, preferably 1 to 30 parts by weight, and most preferably 1 to 20 parts by weight. In some embodiments, the reactive diluent comprises less than 25 parts by weight, preferably less than 15 parts by weight and most preferably less than 10 parts by weight.

The oligomer generally comprises polymerized monomer units comprising:

a) 50 to 99 parts by weight, preferably 60 to 97 parts by weight, most preferably 80 to 95 parts by weight of (meth)acryloyl monomer units homopolymerizable to a polymer having a glass transition temperature $\geq 20°$ C., preferably $\geq 50°$ C., preferably the (meth)acryloyl monomer units are (meth)acrylate monomer units b) 1 to 50 parts by weight, preferably 3 to 40 parts by weight, most preferably 5 to 20 parts by weight, of monomer units having a pendent, free-radically polymerizable functional groups, c) less than 40 parts by weight, preferably less than 30 parts by weight, most preferably less than 20 parts by weight, of monomer units homopolymerizable to a polymer having a glass transition temperature less than 20° C., based on 100 parts by weight of a) and b).

The first component oligomer comprises one or more high $T_g$ monomers, which if homopolymerized, yield a polymer having a $T_g > 20°$ C., preferably $> 50°$ C. Preferred high $T_g$ monomers are monofunctional (meth)acrylate esters of mono- and bicyclic aliphatic alcohols having at least 6 carbon atoms, and of aromatic alcohols. Both the cycloaliphatic and aromatic groups may be substituted, for example, by $C_{1-6}$ alkyl, halogen, sulfur, cyano, and the like. Especially preferred high $T_g$ monomers include 3,5-dimethyladamantyl (meth)acrylate; isobornyl (meth)acrylate; 4-biphenyl (meth)acrylate; phenyl (meth)acrylate; benzyl methacrylate; and 2-naphthyl (meth)acrylate; dicyclopentadienyl (meth)acrylate. Mixtures of high $T_g$ monomers may also be used. Providing the monomer can be polymerized with the rest of the monomers that comprise the (meth)acrylate monomers, any high $T_g$ monomer including styrene, vinylesters and the like, can be used. However, the high $T_g$ monomer is typically an acrylate or methacrylate ester.

Other high $T_g$ monomers include $C_1$-$C_{20}$ alkyl (meth)acrylates such as methyl methacrylate, ethyl methacrylate, isopropyl methacrylate, n-butyl methacrylate, isobutyl methacrylate, t-butyl (meth)acrylate, stearyl methacrylate, cyclohexyl methacrylate, 3,3,5-trimethylcyclohexyl methacrylate, tetrahydrofurfuryl methacrylate, allyl methacrylate, bromoethyl methacrylate; styrene; vinyl toluene; vinyl esters such as vinyl propionate, vinyl acetate, vinyl pivalate, and vinyl neononanoate; acrylamides such as N,N-dimethyl acrylamide, N,N-diethyl acrylamide, N-isopropyl acrylamide, N-octyl acrylamide, and N-t-butyl acrylamide, and (meth)acrylonitrile. Blends of high $T_g$ monomers may be used.

Most preferred high $T_g$ monomers are selected from linear, branched, cyclo, and bridged cycloaliphatic (meth)acrylates, such as isobornyl (meth)acrylate, cyclohexyl methacrylate, 3,3,5-trimethylcyclohexyl methacrylate, methyl methacrylate, ethyl methacrylate, isopropyl methacrylate, n-butyl methacrylate, isobutyl methacrylate, t-butyl (meth)acrylate, stearyl methacrylate, and mixtures thereof, for their environmental (heat and light) stability.

The first component oligomer of the composition comprises one or more pendent groups that include free-radically polymerizable unsaturation. Preferred pendent unsaturated groups include (meth)acryloyl, including (meth)acryloxy, and (meth)acrylamido. Such pendent groups can be incorporated into the polymer in at least two ways. The most direct method is to include among the monomer units of ethylene di(meth)acrylate, 1,6-hexanediol diacrylate (HDDA), or bisphenol-A di(meth)acrylate. Useful polyunsaturated monomers include allyl, propargyl, and crotyl (meth)acrylates, trimethylolpropane triacrylate, pentaerythritol triacrylate, and allyl 2-acrylamido-2,2-dimethylacetate.

Using the "direct method" of incorporating the pendent, free-radically polymerizable functional group, useful functional monomers include those unsaturated aliphatic, cycloaliphatic, and aromatic compounds having up to about 36 carbon atoms that include a functional group capable of free radical addition such as those groups containing a carbon-carbon double bond including vinyl, vinyloxy, (meth)acrylate, (meth)acrylamido, and acetylenic functional groups.

Examples of polyethylenically unsaturated monomers that can be used include, but are not limited to, polyacrylic-functional monomers such as ethylene glycol diacrylate, propylene glycol dimethacrylate, trimethylolpropane triacrylate, 1,6-hexamethylenedioldiacrylate, pentaerythritol di-, tri-, and tetraacrylate, and 1,12-dodecanedioldiacrylate; olefinic-acrylic-functional monomers such as allyl methacrylate, 2-allyloxycarbonylamidoethyl methacrylate, and 2-allylaminoethyl acrylate; allyl 2-acrylamido-2,2-dimethylacetate; divinylbenzene; vinyloxy group-substituted functional monomers such as 2-(ethenyloxy)ethyl (meth)acrylate, 3-(ethynyloxy)-1-propene, 4-(ethynyloxy)-1-butene, and 4-(ethenyloxy)butyl-2-acrylamido-2,2-dimethylacetate, and the like. Useful polyunsaturated monomers, and useful reactive/co-reactive compounds that may be used to prepare a polymer having pendent unsaturation are described in greater detail in U.S. Pat. No. 5,741,543 (Winslow et al.).

Preferred polyunsaturated monomers are those where the unsaturated groups are of unequal reactivity. Those skilled in the art recognize that the particular moieties attached to the unsaturated groups affect the relative reactivities of those unsaturated groups. For example, where a polyunsaturated monomer having unsaturated groups of equal reactivity (e.g., HDDA) is used, premature gellation of the composition must be guarded against by, for example, the presence of oxygen, which acts as a radical scavenger. Conversely, where a polyunsaturated monomer having unsaturated groups of differing reactivities is used, the more reactive group (such as (meth) acrylate as (meth)acrylamido) preferentially is incorporated into the polymer backbone before the less reactive unsaturated group (such as vinyl, allyl, vinyloxy, or acetylenic) reacts to crosslink the composition. The direct method is generally not preferred due to difficulty in control of branching and premature gellation.

An indirect, but preferred, method of incorporating pendent groups that comprise polymerizable unsaturation into the first polymer is to include among the monomer units of the polymer some that comprise a reactive functional group. Useful reactive functional groups include, but are not limited to, hydroxyl, amino (especially secondary amino), oxazolonyl, oxazolinyl, acetoacetyl, carboxyl, isocyanato, epoxy, aziridinyl, acyl halide, and cyclic anhydride groups. Preferred among these are carboxyl, hydroxyl and aziridinyl groups. These pendent reactive functional groups are reacted with unsaturated compounds that comprise functional groups that are co-reactive with the reactive pendent functional group. When the two functional groups react, an oligomer with pendent unsaturation results.

Using the "indirect method" of incorporating the pendent, free-radically polymerizable functional groups, useful reactive functional groups include hydroxyl, secondary amino, oxazolonyl, oxazolonyl, acetyl, acetonyl, carboxyl, isocyanato, epoxy, aziridinyl, acyl halide, vinyloxy, and cyclic anhydride groups. Where the pendent reactive functional group is an isocyanato functional group, the co-reactive functional group preferably comprises a secondary amino or hydroxyl group. Where the pendent reactive functional group comprises a hydroxyl group, the co-reactive functional group preferably comprises a carboxyl, isocyanato, epoxy, anhydride, or oxazolinyl group. Where the pendent reactive functional group comprises a carboxyl group, the co-reactive functional group preferably comprises a hydroxyl, amino, epoxy, isocyanate, or oxazolinyl group. Most generally, the reaction is between nucleophilic and electrophilic functional groups that react by a displacement or condensation mechanism.

Representative examples of useful co-reactive compounds include hydroxyalkyl (meth)acrylates such as 2-hydroxyethyl (meth)acrylate, 4-hydroxybutyl (meth)acrylate, and 2-(2-hydroxyethoxy)ethyl (meth)acrylate; aminoalkyl (meth)acrylates such as 3-aminopropyl (meth)acrylate and 4-aminostyrene; oxazolinyl compounds such as 2-ethenyl-1,3-oxazolin-5-one and 2-propenyl-4,4-dimethyl-1,3-oxazolin-5-one; carboxy-substituted compounds such as (meth)acrylic acid and 4-carboxybenzyl (meth)acrylate; isocyanato-substituted compounds such as isocyanatoethyl (meth)acrylate and 4-isocyanatocyclohexyl (meth)acrylate; epoxy-substituted compounds such as glycidyl (meth)acrylate; aziridinyl-substituted compounds such as N-acryloylaziridine and 1-(2-propenyl)-aziridine; and acryloyl halides such as (meth)acryloyl chloride.

Preferred functional monomers have the general formula wherein $R^1$ is hydrogen, a $C_1$ to $C_4$ alkyl group, or a phenyl group, preferably hydrogen or a methyl group; $R^2$ is a single bond or a divalent linking group that joins an ethylenically unsaturated group to polymerizable or reactive functional group A and preferably contains up to 34, preferably up to 18, more preferably up to 10, carbon and, optionally, oxygen and nitrogen atoms and, when $R^2$ is not a single bond, is preferably selected from wherein $R^3$ is an alkylene group having 1 to 6 carbon atoms, a 5- or 6-membered cycloalkylene group having 5 to 10 carbon atoms, or an alkylene-oxyalkylene in which each alkylene includes 1 to 6 carbon atoms or is a divalent aromatic group having 6 to 16 carbon atoms; and A is a functional group, capable of free-radical addition to carbon-carbon double bonds, or a reactive functional group capable of reacting with a co-reactive functional group for the incorporation of a free-radically polymerizable functional group.

It will be understood, in the context of the above description of the first component oligomer, that the ethylenically-unsaturated monomer possessing a free-radically polymerizable group is chosen such that it is free-radically polymerizable with the crosslinking agent and reactive diluent. The reactions between functional groups provide a crosslink by forming a covalent bond by free-radical addition reactions of ethylenically-unsaturated groups between components. In the present invention the pendent functional groups react by an addition reaction in which no by-product molecules are created, and the exemplified reaction partners react by this preferred mode.

Where the curable composition is to be processed using high temperatures and the direct method of including pendent unsaturation has been used, care must be taken not to activate those pendent groups and cause premature gelation. For example, hot-melt processing temperatures can be kept relatively low and polymerization inhibitors can be added to the mixture. Accordingly, where heat is to be used to process the composition, the above-described indirect method is the preferred way of incorporating the pendent unsaturated groups.

The oligomer may optionally further comprise lower $T_g$ alkyl (meth)acrylate esters or amides that may be homopolymerized to polymers having a $T_g$ of less than 20° C. Alkyl (meth)acrylate ester monomers useful in the invention include straight-chain, cyclic, and branched-chain isomers of alkyl esters containing $C_1$-$C_{20}$ alkyl groups. Due to $T_g$ and side chain crystallinity considerations, preferred lower $T_g$ alkyl (meth)acrylate esters are those having from $C_1$-$C_8$ alkyl groups. Useful specific examples of alkyl (meth)acrylate esters include: methyl acrylate, ethyl acrylate, n-propyl acrylate, butyl acrylate, iso-amyl (meth)acrylate, n-hexyl (meth)acrylate, n-heptyl (meth)acrylate, n-octyl (meth)acrylate, iso-octyl (meth)acrylate, 2-ethylhexyl (meth)acrylate, iso-nonyl (meth)acrylate, and decyl (meth)acrylate. Most preferred (meth)acrylate esters include methyl acrylate, ethyl acrylate, butyl acrylate, isooctyl (meth)acrylate, 2-ethylhexyl (meth)acrylate, cyclohexyl acrylate. The lower $T_g$ alkyl (meth)acrylate esters are added in such an amount such that the resulting oligomer has a $T_g$ of 20° C. or greater. In general, such low $T_g$ monomers are used in amounts of 40 parts by weight or less, preferably 30 parts by weight or less, most preferable 20 parts by weight or less.

The theoretical $T_g$ of an oligomer may be calculated, for example, using the Fox equation, $1/T_g = (w^1/T_g^1 + w^2/T_g^2)$, where $w^1$ and $w^2$ refer to the weight fraction of the two components and $T_g^1$ and $T_g^2$ refer to the glass transition temperature of the two components, as described for example in L. H. Sperling, "Introduction to Physical Polymer Science", $2^{nd}$ Edition, John Wiley & Sons, New York, p. 357 (1992) and T. G. Fox, Bull. Am. Phys. Soc., 1, 123 (1956). Using the $T_g$ of the component monomers, and an estimate of the weight fractions thereof in the oligomer, one may calculate the $T_g$ of the resulting oligomer. As understood by one skilled in the art, the Fox equation may be used for a system with more than two components.

The oligomer may be prepared using radical polymerization techniques by combining an initiator and monomers in the presence of a chain transfer agent. In this reaction, a chain transfer agent transfers the active site on one growing chain to another molecule that can then start a new chain so the degree of polymerization may be controlled. The degree of polymerization of the resulting oligomer may be 10 to 300, preferably 15 to 200, more preferably 20 to 200. It has been found if the degree of polymerization is too high, the composition is too high in viscosity, and not easily melt processable. Conversely, if the degree of polymerization is too low, the shrinkage of the cured composition is excessive and leads to high birefringence in the cured composition.

Chain transfer agents may be used when polymerizing the monomers described herein to control the molecular weight of the resulting oligomer. Suitable chain transfer agents include halogenated hydrocarbons (e.g., carbon tetrabromide) and sulfur compounds (e.g., lauryl mercaptan, butyl mercaptan, ethanethiol, and 2-mercaptoethyl ether, isooctyl thioglycolate, t-dodecylmercaptan, 3-mercapto-1,2-propanediol). The amount of chain transfer agent that is useful depends upon the desired molecular weight of the oligomer and the type of chain transfer agent. The chain transfer agent is typically used in amounts from about 0.1 parts to about 10 parts; preferably 0.1 to about 8 parts; and more preferably from about 0.5 parts to about 6 parts based on total weight of the monomers.

In some embodiments, multifunctional chain transfer agents having two or more functional groups can be used to produce compounds having two or more oligomeric groups. The use of multifunctional chain transfer agents result in higher fracture toughness after cure. Examples of multi-functional chain transfer agents include trimethylolpropane tris (2-mercaptoacetate), trimethylolpropane tris(3-mercaptopropionate), pentaerythritol tetrakis(2-mercaptoacetate), pentaerythritol tetrakis(3-mercaptopropionate), ethylene glycol bis(3-mercaptopropionate), dipentaerythritol hexakis (3-mercaptopropionate), 1,4-butanediol bis(3 mercaptopropionate), tris[2-(3-mercaptopropionyloxy)ethyl]isocyanurate, tetraethylene glycol bis(3-mercaptopropionate), ethylene glycol bisthioglycolate, trimethylolethane trithioglycolate, 1,4-butanediol bismercaptoacetate, and glyceryl thioglycolate, or combinations of these materials. The multi-functional chain transfer agents can also be derived from $\alpha,\omega$-mercaptoalkanes or $\alpha,\omega$-allyl alkanes as known in the art and include 1,10-dimercaptodecane, 1,14-dimercapto tetradecane, 1,10-diallyl decane. Other chain transfer agents comprise $\alpha,\omega$-halogen substituted alkanes such as a,$\alpha,\alpha,\alpha,\omega,\omega$-hexabromodecane. Reference may be made to U.S. Pat. No. 6,395,804 and U.S. Pat. No. 6,201,099 (Peterson et al.) incorporated herein by reference.

Suitable initiators for this oligomerization reaction include, for example, thermal and photo initiators. Useful thermal initiators include azo compounds and peroxides. Examples of useful azo compounds include 2,2'-azobis(2,4-dimethylpentanenitrile), (Vazo 52, commercially available from E. I. duPont de Nemours & Co.); 2,2'-azobis(isobutyronitrile), (Vazo 64, commercially available from E. I. duPont de Nemours & Co.); 2,2'-azobis(2-methylbutyronitrile), (Vazo 67, commercially available from E. I. duPont de Nemours & Co.); 1,1'-azobis(cyanocyclohexane), (Vazo 88, commercially available from E. I. duPont de Nemours & Co.); 1,1'-azobis(1-cyclohexane-1-carbonitrile), (V-40, commercially available from Wako Pure Chemical Industries, Ltd.); and dimethyl 2,2'-azobis(isobutyrate), (V-601, commercially available from Wako Pure Chemical Industries, Ltd.). Examples of useful peroxides include benzoyl peroxide; di-t-amyl peroxide, t-butyl peroxy benzoate, 2,5-dimethyl-2,5 Di-(t-butylperoxy)hexane, 2,5-dimethyl-2,5-Di-(t-butylperoxy) hexyne-3, lauroyl peroxide, and t-butyl peroxy pivalate. Useful organic hydroperoxides include but are not limited to compounds such as t-amyl hydroperoxide and t-butyl hydroperoxide.

Useful photoinitiators include benzoin ethers such as benzoin methyl ether and benzoin butyl ether; acetophenone derivatives such as 2,2-dimethoxy-2-phenyl-acetophenone and 2,2-diethoxy acetophenone; and acylphosphine oxide derivatives and acylphosphonate derivatives such as diphenyl-2,4,6-trimethylbenzoylphosphine oxide, isopropoxy (phenyl)-2,4,6-trimethylbenzoylphosphine oxide, and dimethyl pivaloylphosphonate. Of these, 2,2-dimethoxy-2-phenyl-acetophenone is preferred. The initiator is typically used at a level of 0.001 to 5 parts by weight per 100 parts by weight monomer(s).

The composition further comprises a crosslinking agent having a plurality of pendent, ethylenically unsaturated, free-radically polymerizable functional groups. Useful crosslinking agents have an average functionality (average number of ethylenically unsaturated, free-radically polymerizable functional groups per molecule) of greater than one, and preferably greater than or equal to two. The functional groups are chosen to be copolymerizable with the pendent ethylenically unsaturated, free-radically polymerizable functional groups on the first component oligomer. Useful functional groups include those described for the first component oligomer and include, but are not limited to vinyl, vinyloxy, (meth)acryloyl and acetylenic functional groups.

Useful crosslinking agents have the general formula:

$$R\text{-}(Z)_n$$

where Z is a free-radically polymerizable functional group such as a carbon-carbon double bond, n is greater than 1 and R is an organic radical having a valency of n. Preferably R is an aliphatic alkyl radical of valency n which may be linear or branched.

Examples of such crosslinking agents include: $C_2$-$C_{18}$ alkylenediol di(meth)acrylates, $C_3$-$C_{18}$ alkylenetriol tri (meth)acrylates, such as 1,6-hexanediol di(meth)acrylate, trimethylolpropane tri(meth)acrylate, propoxylated trimethylolpropane triacrylate such as CD501 from Sartomer Co., Exton, Pa., triethyleneglycol di(meth)acrylate, pentaeritritol tri(meth)acrylate, and tripropyleneglycol di(meth)acrylate, and di-trimethylolpropane tetraacrylate, polyalkyleneglycol dimethacrylate such as Bisomer™ EP100DMA from Cognis Co. For ease of mixing, the preferred crosslinking agent is not a solid material at application temperatures.

In some embodiments, it is desirable that the composition comprise a crosslinking agent to impart a higher glass transition temperature to the cured composition. The di(meth) acrylic acid esters, and the bisallyl ethers, of bis(hydroxymethyl)-tricyclo[5.2.1.0$^{2.6}$]-decane and the di(meth)acrylic acid esters of the compounds of bis(hydroxymethyl)-tricyclo [5.2.1.0$^{2.6}$]-decane extended with 1 to 3 ethylene oxide- and/ or propylene oxide units, as described in GB 1,567,080, are also particularly beneficial in raising the $T_g$ of the cured composition without a significant loss in toughness. In some embodiments, the use of such a crosslinking agent increases the toughness. The (meth)acrylic acid esters described in U.S. Pat. No. 4,795,823, incorporated herein by reference, e.g. triglycolic acid-bis[3(4)-methacryloxymethyl-8(9)-tricyclo [5.2.1.0$^{2.6}$]-decylmethylesters are also well-suited.

The composition according to the invention may comprise at least one reactive diluent. The reactive diluents can be used to adjust the viscosity of the composition. Thus, the reactive diluents can each be a low viscosity monomer containing at least one functional group capable of polymerization when exposed to actinic radiation. For example, vinyl reactive diluents and (meth)acrylate monomer diluents may be used.

The functional group present on the reactive diluents may be the same as that used in the curable (meth)acrylate oligomer. Preferably, the radiation-curable functional group present in the reactive diluent is capable of copolymerizing with the radiation-curable functional group present on the radiation-curable oligomer. The reactive diluents generally have a molecular weight of not more than about 550 or a viscosity at room temperature of less than about 500 mPascal·sec (measured as 100% diluent).

The reactive diluent may comprise monomers having a (meth)acryloyl or vinyl functionality and a $C_1$-$C_{20}$ alkyl moiety. Examples of such reactive diluents are ethyl (meth)acrylate, isopropyl (meth)acrylate, t-butyl (meth)acrylate, n-butyl (meth)acrylate, cyclohexyl (meth)acrylate, isobornyl (meth) acrylate, isooctyl (meth)acrylate, 2-ethylhexyl (meth)acrylate, stearyl (meth)acrylate, phenoxyethyl (meth)acrylate, benzyl (meth)acrylate and the like. Low volatile alkyl (meth) acrylates such as isobornyl (meth)acrylate, 2-ethylhexyl (meth)acrylate, cyclohexyl (meth)acrylate, isooctyl (meth) acrylate, stearyl (meth)acrylate, phenoxyethyl (meth)acrylate, benzyl (meth)acrylate and (meth)acrylic acid are preferred reactive diluents.

The reactive diluent is preferably added in such an amount that the shrinkage of the cured compositions does not exceed around 5%, preferably not above around 3%, as measured by the test method described herein. Suitable amounts of the reactive diluents have been found to be less than about 25 parts by weight, preferably about 0 to about 15 parts by weight, and more preferably about 0 to about 10 parts by weight. Preferably, the sum of the amounts of the reactive diluent and the crosslinking agent is less than 40 parts by weight.

The components of the composition may be combined and cured with a photoinitiator. The photoinitiator improves the rate of cure and percent conversion of the curable compositions, but the depth of cure (of thicker coatings or shaped articles) may be deleteriously affected as the photoinitiator may attenuate the transmitted light that penetrates the thickness of the sample. The photoinitiator is used in an amount of less than 1.0 weight %, preferably less than 0.1 weight %, most preferably less than 0.05 weight %.

Conventional photoinitiators can be used. Examples include benzophenones, acetophenone derivatives, such as α-hydroxyalkylphenylketones, benzoin alkyl ethers and benzil ketals, monoacylphosphine oxides, and bis-acylphosphine oxides. Preferred photoinitiators are ethyl 2,4,6-trimethylbenzoylphenyl phosphinate (Lucirin™ TPO-L) available from BASF, Mt. Olive, N.J., 2-hydroxy-2-methyl-1-phenylpropan-1-one (IRGACURE 1173™, Ciba Specialties), 2,2-dimethoxy-2-phenyl acetophenone (IRGACURE 651™, Ciba Specialties), phenyl bis-(2,4,6-trimethyl benzoyl) phosphine oxide (IRGACURE 819, Ciba Specialties). Other suitable photoinitiators include mercaptobenzothiazoles, mercaptobenzooxazoles and hexaryl bisimidazole. Often, mixtures of photoinitiators provide a suitable balance of properties.

The compositions can then be applied to the desired substrate or added to a mold and exposed to actinic radiation such as UV light. The composition may be exposed to any form of actinic radiation, such as visible light or UV radiation, but is preferably exposed to UVA (320 to 390 nm) or UVB (395 to 445 nm) radiation. Generally, the amount of actinic radiation should be sufficient to form a non-tacky, dimensionally stable solid mass. Generally, the amount of energy required for curing the compositions of the invention ranges from about 0.2 to 20.0 J/cm$^2$.

The photopolymerization may be effected by any suitable light source including carbon arc lights, low, medium, or high pressure mercury vapor lamps, swirl-flow plasma arc lamps, xenon flash lamps, ultraviolet light emitting diodes, and ultraviolet light emitting lasers For many applications it may be desirable to use an LED light source or array to effect the curing. Such LED sources may effect a faster cure and provide less heat to the composition during cure. One suitable LED source is the Norlux large area array, series 808 (available from Norlux, Carol Stream, Ill.).

A preferred method of making the oligomer is through an adiabatic polymerization method (see for example, U.S. Pat. No. 5,986,011 (Ellis) or U.S. Pat. No. 5,753,768 (Ellis). In such a polymerization, the polymerization initiator(s) may be used at a low level, to reduce color due to the initiator fragments incorporated into the polymer. Further, during an adiabatic polymerization, partly because of low initiator levels, and partly due to the increasing temperature profile that accompanies polymerization, conditions can be selected such that the initiator is essentially completely consumed during the polymerization or at the end of the polymerization. Having all thermal polymerization initiator consumed advantageously prevents or reduces unwanted polymerization and crosslinking during the functionalization step of the oligomer using the "indirect method" of incorporating the pendent, free-radically polymerizable functional groups (described herein). Further, having no significant traces of thermal initiator present beneficially improve the stability of the functionalized oligomer during storage and transport, prior to molding and further curing.

The adiabatic polymerization process comprises the steps of:

(a) providing the oligomer composition of the invention in a batch reactor;

(b) deoxygenating the mixture, wherein step (b) can optionally at least partially overlap with step (c);

(c) heating the mixture to a sufficient temperature to generate sufficient initiator free radicals from at least one thermal free radical initiator so as to initiate polymerization;

(d) allowing the mixture to polymerize under essentially adiabatic conditions to yield an at least partially polymerized mixture;

(e) optionally heating the mixture to generate free radicals from some or all of any initiator that has not generated initiator free radicals, followed by allowing the mixture to polymerize under essentially adiabatic conditions to yield a further polymerized mixture; and (f) optionally repeating step (e) one or more times.

(g) optionally repeating steps (a) to (e) one or more times with cooling between repeats.

Step (g) is useful if the monomers have a heat of reaction such that it is difficult to achieve the desired conversion to oligomer in one adiabatic polymerization step without getting too hot. Multiple repeats of steps (a) to (e) with cooling between repeats to the proper temperature(s) and then polymerizing adiabatically further in the one or more repeats can be beneficial to control the final polymerization temperature to a desired level. This may prevent yellowing due to polymer degradation as result of the heat of polymerization.

By appropriately selecting initiator(s) and amounts in step (a) and optional use of step (g), the conversion to polymer can be advantageously controlled to be sufficiently high so as to provide curable materials with low shrinkage, residual stress and birefringence. Further, in some instances, the functionalization and addition of reactive diluents can then be performed while in the same reaction equipment minimizing contamination and oxidation of the final curable formulation.

The composition and process for making optical products of the present invention are applicable to a variety of applications needing optical elements including, for example, optical lenses such as Fresnel lenses, prisms, optical films, such as high index of refraction films, non-warping and low birefringence film e.g., microreplicated films such as totally internal reflecting films, or brightness enhancing films, flat films, multilayer films, retroreflective sheeting, optical light fibers or tubes, and others. Such optical products are useful in optical assemblies, optical projection systems, such as projection televisions, as well as displays and other devices containing the optical assemblies. The optical products of this invention include articles that are currently prepared from ground glass, or injection molded plastic.

Such articles may have a thickness of about 0.5 mm or greater, and can be prepared from a curable composition of this invention which is made by mixing in a suitable vessel, in any convenient order, the oligomer, crosslinking agent and/or reactive diluent, and a photoinitiator. Mixing is continued until the components of the composition are in a single phase. Thicknesses of 25 mm articles have been achieved using the composition and curing process of this invention.

At the time of use, the composition is preferably degassed using a vacuum of less than about 25 Torr or by flowing the composition in a thin film past a suitable boundary. The degassed composition is introduced, optionally using a pressure of about 2 to 400 Kg/cm$^2$, into a mold corresponding to the shape of the article that is desired to be prepared. Such molds are generally made of plastic, glass or metal, or combinations thereof.

In one embodiment, the curable composition may be applied to the surface of the mold having the requisite shape or to mold elements corresponding to the desired optical article, such as a lens. The volume of curable composition that enters the mold or mold elements can be controlled by sliding a squeegee across the surface of the mold. The amount of curable composition can also be applied by other known coating techniques, such as by the use of a roller. If desired, heating may be used to reduce the viscosity of the composition and provide more efficient molding. As described, many embodiments of the invention are melt-processable, i.e. possess or achieve a suitable low viscosity for coating or molding at temperatures less than or equal to 100° C.

The mold elements may be completely filled or may be partially filled. If the photopolymerizable composition is a 100% solids, non-shrinking, curable material, then the shape of the cured composition will remain the same as that of the mold elements. However, if the photopolymerizable composition shrinks as it hardens, then the liquid will contract, creating unreliable registration, and introducing optical defects. Preferably, the photopolymerizable composition includes materials that shrink by less than about 5% by volume, and preferably less than about 3%, during curing.

To initiate photopolymerization, the molds are filled, placed under a source of actinic radiation such as a high-energy ultraviolet source having a duration and intensity of such exposure to provide for essentially complete (greater than 80%) polymerization of the composition contained in the molds. If desired, filters may be employed to exclude wavelengths that may deleteriously affect the reactive components or the photopolymerization. Photopolymerization may be effected via an exposed surface of the curable composition, or "through-mold" by appropriate selection of a mold material having the requisite transmission at the wavelengths necessary to effect polymerization.

Photoinitiation energy sources emit actinic radiation, i.e., radiation having a wavelength of 700 nanometers or less which is capable of producing, either directly or indirectly, free radicals capable of initiating addition polymerization and chain-growth polymerization of the optical casting resins of this invention. Preferred photoinitiation energy sources emit ultraviolet radiation, i.e., radiation having a wavelength between about 180 and 460 nanometers, including photoinitiation energy sources such as carbon arc lights, low, medium, or high pressure mercury vapor lamps, swirl-flow plasma arc lamps, xenon flash lamps, ultraviolet light emitting diodes, and ultraviolet light emitting lasers. Particularly preferred ultraviolet light sources are xenon flash lamps available from Xenon Corp, Wilburn, Mass., such as models RC-600, RC-700 and RC-747 pulsed UV-Vis curing systems and LED sources such as Norlux Series 808 large area array, (available from Norlux, Carol Stream, Ill.). Although not preferred, the curable composition may also use convention thermal initiators, previously described.

In some embodiments, the optical product can contain one or more features, such as flat or curved surfaces (including convex and concave surfaces), or replicated or microreplicated surfaces (such as Fresnel lenses), either of which can be derived from the composition of the invention and a suitable mold. Structure-bearing articles can be constructed in a variety of forms, including those including plurality of linear prismatic structures having a series of alternating tips and grooves. An example of such a film is BEF, having regular repeating pattern of symmetrical tips and grooves. Other examples include patterns in which the tips and grooves are not symmetrical and in which the size, orientation, or distance between the tips and grooves is not uniform. Several examples of surface structure bearing articles useful as brightness enhancing films are described in U.S. Pat. No. 5,175,030, (Lu et al.) and U.S. Pat. No. 5,183,597, (Lu).

According to the descriptions of Lu and Lu et al., a structure-bearing optical product can be prepared by a method including the steps of (a) preparing a polymerizable composition; (b) depositing the polymerizable composition onto a master negative microstructured molding surface in an amount barely sufficient to fill the cavities of the master; (c) filling the cavities by moving a bead of the polymerizable composition between a preformed base and the master, at least one of which is flexible; and (d) curing the composition. The master can be metallic, such as nickel, nickel-plated copper or brass, or can be a thermoplastic material that is stable under the polymerization conditions, and that preferably has a surface energy that allows clean removal of the polymerized material from the master.

Figure 1:
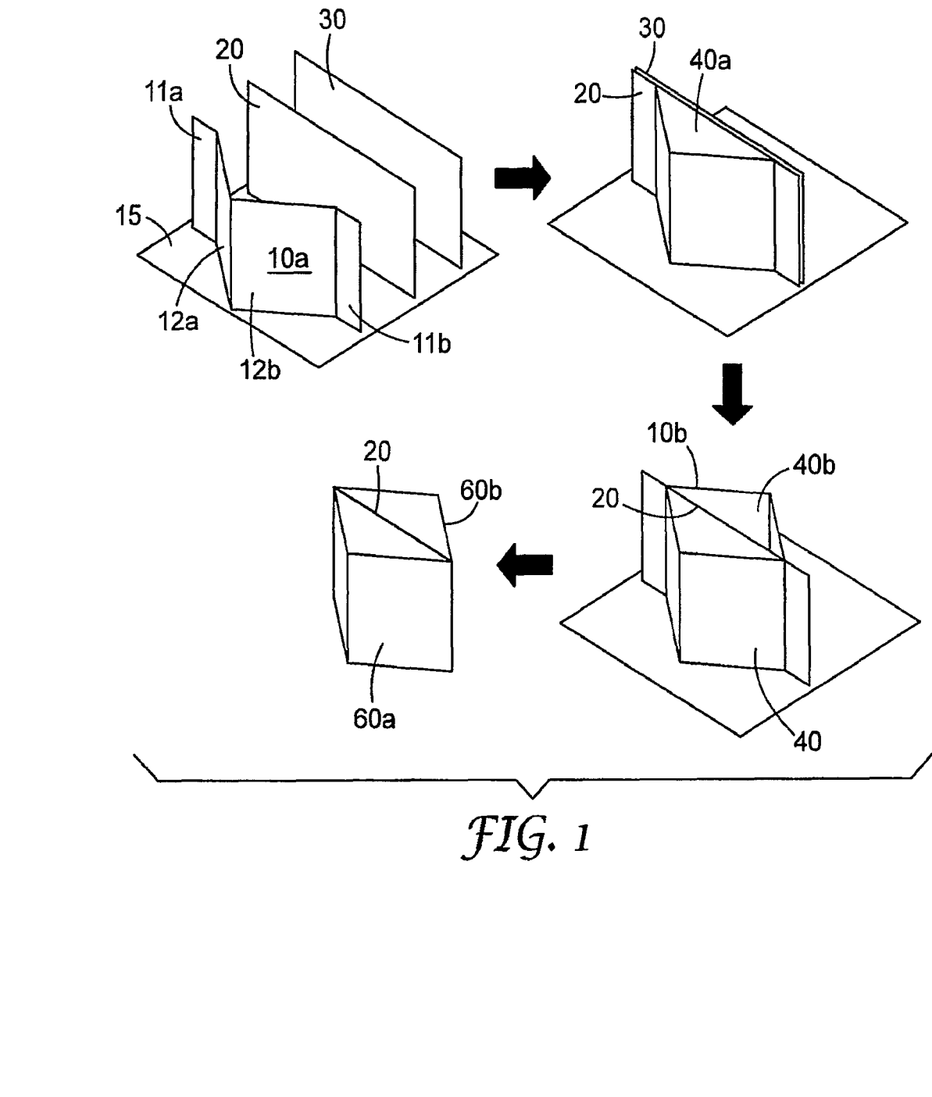
FIGS. 1 and 2 are schematics of a process of the invention.

In a preferred embodiment, the optical article comprises a polarizing beam splitter, wherein incident light is split into first and second substantially polarized beam states that may be used in an image display system. As shown in FIG. 1, the beam splitter comprises a first prism (60*a*), a second prism (60*b*) and a polarizing layer having a pass axis disposed therebetween (20). At least one prism comprises the instant cured composition. Each of the prisms has a first surface coincident with the polarizing layer, and two or more outer surfaces. As used herein, the term "prism" refers to an optical element that controls the angular transmission of incident light through the polarizing layer, and the angular character of light exiting the article. The prisms may be regular polygons, such as triangular prisms, or may have one or more features that confer optical power to the article, such as curved faces, or microreplicated features, such as microlenses (and arrays thereof) or Fresnel lenses. Further, the prisms may further comprise mirrored elements, such as a vapor deposited metal coating on or more surfaces.

Although depicted as including two triangular prisms (see FIGS. 1 and 2), the prisms may be any suitable shape disposed on one or both sides of the polarizing layer to achieve the desired purpose of the PBS. In some embodiments, one or more of the outer surfaces of the first and second prisms, i.e. one of the surfaces not adjacent the polarizing layer, may be curved, either convex or concave, or may comprise a structured surface, such as a Fresnel lens surface. Such curved surfaces provide optical power to the polarizing beam splitter; i.e., they converge or diverge light passing therethrough. The degree to which a lens or mirror converges or diverges light usually is equal to the reciprocal of the focal length of the device.

Further, one or more of the first surfaces (i.e. the surface adjacent to the polarizing layer) may be curved or microreplicated. For example, a first prism may have a convex first surface, and a second prism may have a mating concave first surface, with a polarizing layer disposed therebetween. Further, one or more of the outer surfaces of the first and second prisms, (i.e. one of the surfaces not adjacent the polarizing-layer), may be fully or partially reflective; i.e. comprises a vapor-deposited metal coating.

Reflective polarizing layers in exemplary PBS's constructed according to the present disclosure include linear reflective polarizers having a pass axis. In one embodiment, the polarizing layer may be a wire grid polarizer, such as those described in Schnabel et al., "Study on Polarizing Visible Light by Subwavelength-Period Metal-Stripe Gratings", Optical Engineering 38(2), pp. 220-226, February 1999, relevant portions of which are hereby included by reference. A wire grid polarizer consists of an array of very fine parallel lines or ribbons of metal coated on glass or other transparent substrates. The wire array efficiently polarizes the incident light when the width and spacing are small compared to the incident wavelength(s). Common metals for the wire grid array include gold, silver, and aluminum among others known in the art.

In one embodiment the polarizing beam splitter may comprise a first prism having a first surface and at least two outer surfaces, a second prism having a first surface and least two outer surfaces, and a wire grid polarizer disposed between the first surfaces of the first and second prisms. Preferably, a wire grid polarizer comprising a substrate, such as glass, is bonded to the first surfaces by means of an optical adhesive. Less preferably, the wire grid is deposited, such as by vapor deposition techniques, on one of said first surfaces, and the second prism bonded thereto.

Wire-grid polarizers absorb small portions of the received light. This generates heat in the substrates and is therefore not preferred. For example, 5-10% of the light is absorbed by aluminum stripes in the same manner as an aluminum mirror surface. Since the performance of the wire-grid polarizer is sensitive to the geometric stability of the metal stripes, a small change in the substrates due to thermal expansion can degrade the polarizer's performance.

In another embodiment, the polarizing layer may comprise alternating repeating layers of a pair of inorganic thin film materials deposited on the first surface of one or both prisms. The pair of thin film materials comprises one low refractive index material and one high refractive index material. The indices, called a MacNeille pair, are chosen such that, for a given angle of incidence of a light beam, the reflection coefficient for p-polarized light (rd is essentially zero at each thin film interface. The angle at which $r_p$ is zero is called the Brewster angle, and the formula relating the Brewster angle to the numerical values of the indices is called the MacNeille condition. The reflection coefficient for s-polarized light ($r_s$) is non-zero at each thin film interface. Therefore, as more thin film layers are added, the total reflectivity for s-polarized light increases while the reflectivity for p-polarized light remains essentially zero. Thus, an unpolarized beam of light, incident upon the thin film stack, has some or all of the s-polarized components reflected while essentially all of the p-polarized component is transmitted.

In one embodiment, the repeating layers of a pair of inorganic thin film materials (the optical stack) is deposited on the first surface of a prism and the bonded to the first surface of a second prism, such as with an optical adhesive to form a polarizing beam splitter. The polarizing beam splitter comprises at least one set of pairs of alternating layers of materials having low and high indices of refraction compared to each other. The thicknesses of the layers are chosen such that the quarterwave criterion is met for the wavelength of the incident collimated light beam by each of layers of low and high refractive index material. The optical properties of the prism material, and the properties of the composite optical stack, all combine to divide the incident light beam into two polarization components.

Suitable materials for the thin films include any materials that are transparent (exhibit low absorption) in the spectrum of interest. For broadband visible light, suitable thin film materials are silicon dioxide (n=1.45), amorphous hydrogenated silicon nitride (n=1.68-2.0); titanium dioxide (n=2.2-

2.5); magnesium fluoride) (n=1.38); cryolite (Na$_3$AlF$_6$, n=1.35); zinc sulphide (n=2.1-2.4); zirconium oxide (n=2.05); hafnium oxide (n=2.0); and aluminum nitride (n=2.2).

Several thin film deposition techniques can be used to deposit the composite optical stack on the prisms, including thermal and electron beam evaporation, and ion beam sputtering and magnetron sputtering. However, thermal and electron beam evaporation should provide good thin film qualities and sufficiently high deposition rates for acceptable manufacturing rates. More importantly, low index films such as magnesium fluoride and cryolite can be deposited by this method. Electron beam deposition is regularly used in the coatings industry for high index materials such as titanium dioxide, zirconium oxide, hafnium oxide, and aluminum nitride.

Preferably, the polarizing layer may be a multilayer optical film. Examples of reflective polarizing films suitable for use as polarizing film in the embodiments of the present disclosure include reflective polarizers including a birefringent material, manufactured by 3M Corporation, St. Paul, Minn., such as those described in U.S. Pat. No. 5,882,774, (Jonza et al.); U.S. Pat. No. 6,609,795 (Weber et al.); and U.S. Pat. No. 6,719,426 (Magarill et al.). Suitable reflective polarizing films for polarizing film 22 also include polymeric reflective polarizing films that include multiple layers of different polymeric materials. For example, polarizing film may include a first layer and a second layer, where the polymeric materials of the first and second layer are different and at least one of the first and second layers is birefringent. In one embodiment of the present disclosure, the polarizing film may include a multi-layer stack of first and second alternating layers of different polymer materials, as disclosed in U.S. Pat. No. 6,609,795 (Weber et al.). Other materials suitable for making multilayer reflective polarizers are listed, for example in Jonza et al., U.S. Pat. No. 5,882,774; Weber et al., U.S. Pat. No. 6,609,795. In another embodiment of the present disclosure, multiple reflective polarizing films may be used.

Suitable reflective polarizing films are typically characterized by a large refractive index difference between first and second polymeric materials along a first direction in the plane of the film and a small refractive index difference between first and second polymeric materials along a second direction in the plane of the film, orthogonal to the first direction. In some exemplary embodiments, reflective polarizing films are also characterized by a small refractive index difference between the first and second polymeric materials along the thickness direction of the film (e.g., between the first and second layers of different polymeric materials). Examples of suitable refractive index differences between the first and second polymeric materials in the stretched direction (i.e., x-direction) range from about 0.15 to about 0.20. The refractive indices in the non-stretched directions (i.e., the y-direction and the z-direction) are desirably within about 5% of one another for a given material or layer, and within about 5% of the corresponding non-stretched directions of a different material or an adjacent layer.

The polymeric materials selected for the layers of an exemplary multilayer polarizing film may include materials that exhibit low levels of light absorption. For example, polyethylene terephthalate (PET) exhibits an absorption coefficient of less than $1.0 \times 10^{-5}$ centimeter$^{-1}$. Accordingly, for a reflective polarizer film that includes PET and has a thickness of about 125 micrometers, the calculated absorption is about 0.000023%, which is about 1/200,000 of an absorption of a comparable wire-grid polarizer.

Low absorptions are desirable because polarizers used in PBS's are exposed to very high light density, which can lead to the failure of the polarizers. For example, absorptive-type polarizer films absorb all the light with unwanted polarization. This generates significant heat. Substrates with high thermal conductivity, such as sapphire, are therefore needed to conduct the heat away from the polarizer films. Moreover, the substrates are exposed to high heat loads, which correspondingly generate thermal birefringence in the substrates. Thermal birefringence in the substrates degrades the contrast and contrast uniformity of the optical system, such as an image display system. As a result, only few materials can be qualified for the substrates with traditional PBS's (e.g., sapphire, quartz, leads content glass, and ceramics).

The present invention provides a multilayer article comprising a multilayer optical film and a cured optical coating on one or both major surfaces of the optical film. Providing such a coating protects the multilayer optical film from environmental stresses and adds strength and rigidity thereto. The multilayer article may be prepared by providing a multilayer optical film, coating at least one major surface of the multilayer optical film with the curable composition, and curing. In another embodiment, separately prepared films comprising the cured composition may be adhered to one or both major surfaces of the multilayer optical film by means of an optical adhesive, described further herein.

The present invention provides a method of making a polarizing beam splitter. The method comprises introducing the curable composition into a suitable mold, and curing the composition to form a prism. The mold may be of any suitable configuration, one or more surfaces of which may be curved. The polarizing layer may then be bonded, adhered, or otherwise affixed to the resulting prism(s) by any optical adhesive, such as known in the art. In one embodiment, a first prism may be bonded to a first surface of the polarizing layer, the second prism bonded sequentially to the exposed surface of the polarizing layer. In another embodiment, the first and second prisms are concurrently bonded to opposite surfaces of the polarizing layer.

Useful optical adhesives are substantially free of UV-absorbing chromophores such as extended aromatic structures or conjugated double bonds. Useful adhesives include, for example: NOA61, a UV cured thiol-ene based adhesive available from the Norland Company (Cranbury, N.J.); Loctite series (e.g., 3492, 3175) UV cured acrylic adhesives available from Henkel Loctite Corp., 1001 Trout Brook Crossing, Rocky Hill, Conn. 06067 (www.loctite.com). OP series (e.g., 21, 4-20632, 54, 44) UV cured acrylic adhesives available from Dymax Corporation, Torrington, Conn.

One useful adhesive include those compositions described in U.S. Published Appln. No. 20040202879 (Xia et al.), which comprise at least one polymer with either an acid or base functionality that forms a pressure sensitive adhesive, a high $T_g$ polymer with an weight average molecular weight greater than 100,000 with an acid or base functionality, and a crosslinker, wherein the functionality on the pressure sensitive adhesive and the high $T_g$ polymer cause an acid-base interaction that forms a compatibilized blend. After accelerated aging of the adhesive composition at 80° C. and 90% relative humidity for approximately 500 hours in an oven, the adhesive mixture is translucent or optically clear.

Another useful adhesive includes microstructured adhesive, which comprise a continuous layer of a pressure-sensitive adhesive having a microstructured surface, wherein the microstructured surface comprises a series of features and wherein the lateral aspect ratio of the features range from about 0.1 to about 10, wherein the spacing aspect ratio of the features range from about 1 to about 1.9, and wherein each feature has a height of about 2.5 to about 375 micrometers. Such adhesives are described in U.S. Pat. Nos. 5,650,215, 6,123,890, 6,315,851, 6,440,880 and 6,838,150 (each Benson et al.).

Other useful adhesives include Soken™ 1885 PSA (commercially available from Soken Chemical & Engineering Co., Ltd, Japan), NEA PSA (as described in the Example 1 of published U.S. 20040202879 (Lu et al.)), Lens Bond™ Type C59 (a thermally cured styrene based adhesive available from Summers Optical, Hatfield, Pa., a division of EMS Acquisition Corp., and NOA61™ (a UV cured thiol-ene based adhesive, available from Norland Company, Cranbury, N.J.).

In another embodiment, the polarizer may be prepared as shown schematically in FIG. 1. Here, a prism mold 10a, having an open first surface or face, and optional tabs 11a and b, is combined with a polarizing layer 20 and rigid side plate 30. The angles between the mold faces may be varied as desired, and either or both outer faces 12a/b may be curved or have any desired pattern imparted thereto, such as a diffracting pattern, including a Fresnel lens may be integrally molded. The respective first surfaces (those coincident with the polarizing layer 20) of the first and second prisms may also be curved, or have an integral replicated pattern. Advantageously, the curved first surfaces of the first and second prisms may configured so they may be mated, such as with a concave and convex surface, with the polarizing layer 20 disposed therebetween.

The parts 10a, 20 and 30 may be secured via clamps on tabs 11a/b, or by other suitable means. A tensioning means (not shown) may be used to maintain the polarizing layer 20 flat. The assembled mold may rest on a smooth, rigid surface 15, such as glass, or an integral bottom (not shown) may be provided to the mold 10a. This assembly defines a prism shaped cavity 40a, into which the curable composition may be introduced, and cured by application of UV energy. If desired, a second rigid surface (not shown) may cover the top of the mold to protect it from atmospheric oxygen. Desirably, either rigid surface 15 or second rigid surface is made of glass or other suitable material which is transparent to the incident light source used for curing. Alternatively to the second rigid surface, the mold assembly may be blanketed with an inert glass to exclude oxygen.

Upon cure, the rigid side plate 30 may be removed, and a second prism mold 10b secured thereto, forming a second chamber 40b, with the polarizing layer 20 forming the common faces between molds 10a and 10b, so that the first surfaces of the first and second prisms will each be adjacent the polarizing layer. As result of the curing the polarizing layer is now integral to the first surface of the first prism-shaped cured composition. The second mold may also have curved outer faces or other desired molded shapes (not shown). This second chamber 40b may be filled with the curable composition, cured, the mold assembly removed to provide a polarizing beam splitter 60a having two prisms, and an integral polarizing layer disposed therebetween, on the respective first surfaces of the prisms. If desired, the respective prisms may be provided, by a suitably configured mold, with integral interlocking tabs for securing the first and second prisms together, or for securing the beam splitter into a mount in a display device. Further, the first and second prisms may be providing with alignment means, such as tabs or indicators, for aligning the first and second prisms with respect to each other, the polarizing layer, or in a mount in a display device.

The alignment means may comprise corresponding male and female portions that interconnect. The polarizing beams splitter may comprise a first prism and second prism, where first prism includes male portion, and second prism that includes female portion. Male portion may be a rectangular surface that encompasses a portion of the surface of first prism adjacent to the reflective polarizing film, and which projects therefrom. Similarly, female portion may be a rectangular depression that is disposed within the majority of the surface of second prism adjacent to the reflective polarizing film.

The male members and female portions may be substituted with other engagement mechanisms such that one prism includes at least one male member that is configured to engage with a respective female portion located in the opposing prism. Those of ordinary skill in the art will also readily appreciate that different numbers of the male members and the female portions than those exemplified herein may be used in accordance with the present disclosure. For example, an exemplary PBS may include three or more male members received within three or more female portions.

The male members and the female portions discussed above may be molded with the respective first and second prisms. The first and second prisms may then be secured together with the assistance of the male portions and the female portions to form polarizing beam splitters. This technique may involve placing the reflective polarizing film between the first prism and the second prism. The first prism may then be oriented relative to the second prism such that the male portion(s) are aligned with the corresponding female portion(s). This alignment is beneficial for ensuring that the first prism is accurately positioned relative to the second prism. The first prism may then engage second prism by concurrently inserting male portions into the corresponding female portions. This compresses the reflective polarizing film between the incident surfaces of the first prism and the second prism to provide a smooth, planar interface. The male portion(s) may be secured to the corresponding female portions with an adhesive. Additionally, the first prism may be secured to the second prism by fitting and/or welding the male members to the corresponding female portions (e.g., ultrasonic, infrared, heat staking, snap fits, press fits, and chemical welding).

Figure 2:
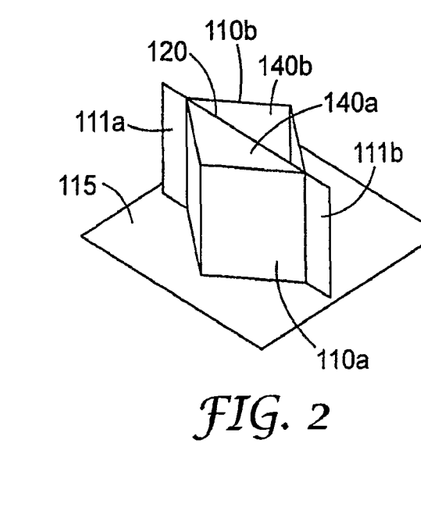

An alternate process is shown schematically in FIG. 2. Here, two prism molds having open faces, 110a and 110b (corresponding to the first surfaces of the resultant prisms) are secured together via optional tabs 111a and b (or any suitable means), with the polarizing layer 120 disposed between on the common first faces of molds 110a and b. If desired, and tensioning means may be used to maintain the polarizing layer 120 flat. This creates two chambers 140a/b that may be filled with the curable composition, and cured to produce a polarizing beam splitter, with an integral polarizing layer, in a single step. Again, the molds may be of any suitable shape and size, and the exterior faces may be curved.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted.

Table of Abbreviations

| Abbreviation or Trade Designation | Description |
|---|---|
| IBOA | Isobornyl acrylate, available from Sartomer Company Inc, Exton, PA |
| MMA | Methyl methacrylate |
| HBA | 4-Hydroxybutyl acrylate, available from San Esters Corporation, New York |
| PETMP | Pentaerythritol tetramercaptopropionate |
| TMPTMP | Trimethylol propane trismercaptopropionate |
| Luperox 130XL45 | 2,5-Di(t-butylperoxy)-2,5-dimethyl-3-hexyne, available from Arkema Inc., Philadelphia, PA |
| T-acrylate | Tricyclo[5.2.1.0$^{2,6}$]decane dimethanol diacrylate |
| Bisomer EP100DMA | Polyalkylene glycol dimethacrylate, available from Cognis Corp., Cincinnati, OH |
| Irganox 1076 | Octadecyl 3,5-Di-(tert)-butyl-4-hydroxyhydrocinnamate, available from Ciba Specialty Chemicals Corporation, Tarrytown, NY |
| HEA | Hydroxyethyl acrylate |
| HEMA | Hydroxyethyl methacrylate |
| IOTG | Isooctyl thioglycolate, available from TCI America, Portland, OR |
| MCE | Mercaptoethanol |
| IEM | Isocyanatoethyl methacrylate, available from Showa Denka, Japan |
| MAnh | Methacrylic anhydride |
| HDDMA | 1,6 Hexanediol dimethacrylate, SR239, available from Sartomer Company Inc, Exton, PA |
| Vazo 52 | 2,2'-Azobis(2,4-dimethylvaleronitrile), available from DuPont Company, Wilmington, DE |
| Vazo 88 | 1,1'-Azobis(cyanocyclohexane), available from DuPont Company, Wilmington, DE |
| DBDL | Dibutyltin dilaurate |
| A31 Release Liner | A silicone liner from DuPont TeiJin Films U.S. Limited Partnership, Wilmington, DE |
| Lucirin TPO-L | Ethyl 2,4,6-trimethylbenzoyl phenyl phosphinate available from BASF, Mt. Olive, NJ |
| CN945A60 | Trifunctional aliphatic urethane acrylate blended with SR306, (tripropyleneglycol diacrylate), in an approximate 60:40 ratio available from Sartomer Company Inc, Exton, PA |
| CN1963 | Aliphatic urethane dimethacrylate blended with TMPTMA (trimethylolpropane trimethacrylate), in an approximate 75:25 ratio available from Sartomer Company Inc, Exton, PA |
| Ebecryl 600 | Bisphenol-A epoxy diacrylate available from Surface Specialties UCB, Smyrna, GA |
| Ebecryl 830 | Polyester hexaacrylate available from Surface Specialties UCB, Smyrna, GA |
| PBS FILM | multilayer reflective polarizing film manufactured by 3M Corporation, St. Paul, MN, described in U.S. Pat. No. 5,882,774, (Jonza et al.); U.S. Pat. No. 6,609,795 (Weber et al.); and U.S. Pat. No. 6,719,426 (Magarill et al.). |

Test Methods

Molecular Weight Measurement by SEC

Size exclusion chromatography (SEC) for molecular weight and molecular weight distribution was performed using a Waters 717 Plus autosampler, 1515 HPLC pump, 2410 differential detector, and the following Waters columns: Styragel HR 5E, Styragel HR 1. All samples were run in THF at 35° C. with a flow rate of 1.0 mL/min. Linear polystyrene standards were used for calibration.

Dynamic Mechanical Analysis (DMA) Measurement

DMA for Tg and modulus determination of cured compositions was performed using a LC-ARES Test Station (Rheometric Scientific, Piscataway, N.J.) in a torsion mode. The sample size was approximately 25 millimeters by 10 millimeters by 1 millimeter. The length of the sample was measured by the test station and the width and thickness of the sample were measured with a caliper. The test was performed by ramping the temperature from 25° C. to 180° C. at 5° C. per minute. The frequency used was 1 Hertz.

Yellowing Resistance Test

The % Transmittance (% T) at a wavelength of 420 nanometers of 3.2 centimeter (1.25 inches) diameter by 0.5 centimeter (0.19 inch) thick cured samples was measured before and after 7 days aging in a 120° C. oven. The % T was measured using a TCS Plus Spectrophotometer (BYK-Gardner USA, Silver Spring, Mo.). Generally, samples with % T at 420 nanometers of less than 85% display a yellow color. A sample is considered to have good yellowing resistance if the % T at 420 nanometers after aging is greater than 85%.

Volume Shrinkage Determination

Density of the curable compositions and the cured materials were measured by a pycnometer. % volume shrinkage was calculated based on the density change during cure of the curable materials. % volume shrinkage=100×(density of cured material−density of curable material before cure)/density of curable material before cure.

Water Absorption Measurement

A weighed 3.2 centimeter (1.25 inches) diameter by 0.5 centimeter (0.19 inch) thick cured disk sample is placed in water at 23° C. for 14 days. % water absorption=100×(sample weight after 14 days in water−sample weight before water soaking)/sample weight before water soaking.

Birefringence Determination

Transmission Spectral Ellipsometry (TSE) was used to measure retardance of the sample. Birefringence of the sample was determined by dividing the retardance by sample thickness. The sample is a round disc, 3.2 centimeter (1.25 inches) diameter by 0.5 centimeter (0.19 inch) thick. The sample was mounted on a rotating stage, and the TSE retardance data was measured at a series of positions using a J.A. Woollam M2000 Variable Angle Spectral Ellipsometer. In-plane measurements were taken at 4 locations 6 millimeters apart in two orthogonal directions, for a total of 8 in-plane measurements. The measured retardances were averaged in the wavelength range between $\lambda$=545-555 nanometers.

Fracture Toughness

The fracture toughness was measured using single-edge-notched beam fracture tests as described in ASTM D 5045-99. 4.5 mm-thick disks of the material were cut with a diamond saw into two beams with a nominal width of 9 mm. The beams were then notched on one side using a diamond saw to produce single-edge-notched beam specimens with nominal thickness of 4.5 mm, and width of 9 mm, and length between 37 mm and 47 mm. A crack was introduced in each specimen by tapping a razor blade in the notch. The specimens were then tested to failure with a Sintech/MTS load frame with support rollers spaced 36 mm apart in the configuration described in the standard. The test temperature was 22° C., and the loading rate was 10 mm/min. In all cases, the load displacement curve showed linear elastic loading followed by catastrophic fast fracture. The fracture toughness was then calculated as described in the standard.

Examples 1-7

Preparation of Oligomer Syrups

In Examples 1-7, IBOA, HEA, chain transfer agent IOTG or MCE, and the $1^{st}$ charge of thermal initiators Vazo 52 and 88, according to Table 1, were added to a four neck flask equipped with a reflux condenser, thermometer, mechanical stirrer, and nitrogen gas inlet. The mixture was stirred and heated to 60° C. under nitrogen. The temperature of the reaction mixture peaked at around 150° C. during the polymerization. After the reaction peak, the batch was further polymerized at 140° C. for 30 minutes with the addition of the $2^{nd}$ initiator, Vazo 88, to reduce residual monomers and eliminate initiator. A sample was taken at the end of this reaction period for oligomer molecular weight determination by SEC. After that, the batch was cooled to 100° C. The HDDMA reactive diluent was added to the reactor to reduce viscosity of the batch. A solution of the DBDL catalyst in IEM was then added to the batch to react with the hydroxyls on the IBOA/HEA polymer chains, incorporating methacrylate functional groups to the polymer. The reaction was complete in 2 hours.

Preparation of Cured Samples:

After completion of the reaction, the reactive oligomer syrups of Table 1 were formulated with 0.02 weight % TPOL photoinitiator and cured by a xenon flash lamp according to the procedures described in the section Preparation of Test Samples. The cured samples were tested for % volume shrinkage, birefringence, Tg, water absorption, % transmittance, and aging stability, using the methods described in the above Test Method section.

TABLE 1

| | Example | | | | | | |
|---|---|---|---|---|---|---|---|
| | 1 | 2 | 3 | 4 | 5 | 6 | 7 |
| IBOA* (g) | 190.0 | 190.0 | 190.0 | 190.0 | 180.0 | 180.0 | 190.0 |
| HEA (g) | 10.0 | 10.0 | 10.0 | 10.0 | 20.0 | 20.0 | 10.0 |
| IOTG (g) | 1.0 | 2.0 | 4.0 | 16.0 | 16.0 | — | 4.0 |
| MCE (g) | — | — | — | — | — | 20.0 | — |
| Vazo 52/(g) | 0.025/ | 0.025/ | 0.025/ | 0.025/ | 0.025/ | 0.025/ | 0.025/ |
| Vazo 88 (g) | 0.025 | 0.025 | 0.025 | 0.025 | 0.025 | 0.025 | 0.025 |
| Vazo 88 (g) | 0.050 | 0.050 | 0.050 | 0.050 | 0.050 | 0.050 | 0.050 |
| HDDMA* (g) | 66.7 | 50.0 | 50.0 | 22.2 | 22.2 | 22.2 | 22.2 |
| IEM* (g) | 13.36 | 13.36 | 13.36 | 13.36 | 26.7 | 53.4 | 13.36 |
| DBDL (g) | 0.0467 | 0.0467 | 0.0467 | 0.0467 | 0.093 | 0.18 | 0.0467 |

*The IBOA monomer and HDDMA reactive diluent in Examples 3, 4 and 5 were purified by passing through a column of activated basic aluminum oxide powder, Brokmann1, ~150 mesh, 58 A°, 155 m²/g, from Aldrich to remove inhibitors. The IEM monomer in the same examples was distilled to remove the inhibitor. The other ingredients in Examples 3, 4, and 5, and all ingredients in Examples 1, 2, 6, and 7 were used as received from the vendors without purification.

Examples 8-9 and Comparative Example C1

To prepare the reactive oligomer syrups of Examples 8-9 and Comparative Example C1, HDDMA reactive diluent, according to Table 2, was added to samples of the reactive oligomer syrup prepared in Example 7. The reactive oligomer syrups were formulated with 0.02 weight % TPOL photoinitiator and cured by a xenon flash lamp at 80° C. for 5 minutes. The cured samples were tested for % volume shrinkage, birefringence, Tg, water absorption, % transmittance, and aging stability, using the methods described in the above Test Method section.

TABLE 2

| | Example | | |
|---|---|---|---|
| | 8 | 9 | C1 |
| Oligomer/HDDMA Ratio | 80/20 | 70/30 | 60/40 |
| Example 7 (grams) | 20.0 | 20.0 | 20.0 |
| HDDMA (grams) | 2.50 | 5.71 | 10.0 |
| Lucirin TPOL (grams) | 0.0045 | 0.0051 | 0.0060 |

Examples 10-11

To prepare reactive oligomer syrups of Example 10 and 11 in Table 3, the same polymerization procedure described in the Examples 1-7 above was followed, except 30 minutes after the addition of the $2^{nd}$ initiator at 140° C., MAnh was added and the mixture was reacted at 140° C. for another 3 hours with efficient stirring. After that, the batch was cooled down to 110° C. and HDDMA reactive diluent was added to the reactor to further reduce the viscosity of the batch.

TABLE 3

| | Example | |
|---|---|---|
| | 10 | 11 |
| IBOA (g) | 190 | 160 |
| MMA (g) | 0 | 26 |
| HEA (g) | 10 | 10 |
| HEMA (g) | 0 | 4 |
| IOTG (g) | 4 | 8 |
| Vazo 52/(g) | 0.025/ | 0.025/ |
| Vazo 88 (g) | 0.025 | 0.025 |
| Vazo 88 (g) | 0.050 | 0.050 |
| MAnh (g) | 14.12 | 19.16 |
| HDDMA (g) | 50 | 35.3 |

Comparative Examples C2-C5

The reactive oligomer or oligomer and reactive diluent mixtures, CN945A60, CN1963, Ebecryl 600 and Ebecryl 830, were formulated with 0.02% TPOL photoinitiator and cured by a Xenon Flash lamp at 80° C. for 5 minutes according to procedures described in the preparation of test sample.

TABLE 4

| | Comparative Example | | | |
|---|---|---|---|---|
| | C2 | C3 | C4 | C5 |
| CN945A60 (g) | 100 | — | — | — |
| CN1963 (g) | — | 100 | — | — |
| Ebecryl 600 (g) | — | — | 100 | — |
| Ebecryl 830 (g) | — | — | — | 100 |
| Lucirin TPOL (g) | 0.02 | 0.02 | 0.02 | 0.02 |

Preparation of Test Samples of Examples 1-11 and Comparative Examples C1-C5

Curable compositions with photoinitiator and other additives were prepared by preheating the oligomer syrups described in the Examples and Comparative Examples with a desired photoinitiator and other additives (if used) at 80° C. and mixing in a white disposable cup by a DAC-100 mixer (both cup and mixer are available from Flack Tek Inc, Landrum, N.J.). The compositions were degassed in a vacuum chamber and then allowed to cool to room temperature before use.

Curing of the above curable materials was carried out by the following steps: 1) Onto a Pyrex glass plate approximately 15 centimeters (6 inches) by 15 centimeters (6 inches) by 0.5 centimeter (0.19 inch) was placed an approximately 15 centimeters (6 inches) by 15 centimeters (6 inches) piece of 51 micrometers (2 mils) A31 release liner, 2) on top of the release liner was placed an approximate same size glass or silicone rubber mold with a 3 centimeter (1.25 inches) diameter opening at the center, 3) then the mold was filled with the curable compositions taking care to avoid bubbles, 4) then a second piece of approximately 15 centimeters (6 inches) by 15 centimeters (6 inches) of 51 micrometers (2 mils) A31 release liner was placed on top of the filled mold, 5) another Pyrex glass plate approximately 15 centimeters (6 inches) by 15 centimeters (6 inches) by 0.5 centimeter (0.19 inch) was placed on top of the release liner, and 6) finally, the filled mold was placed onto a heating station at 80° C. in a chamber and allowed to equilibrate. The curable compositions were cured by a Xenon flash lamp (Model #4.2 Lamp Hsg, pulse rate of 8 Hz) with RC-747 Pulsed UV/Visible System (Xenon Corporation, Woburn, Mass.) for 5 minutes.

The weight average molecular weight which was measured by SEC, the Tg which was measured by Dynamic Mechanical Analysis (DMA), the % volume shrinkage which was determined by a pycnometer, and the birefringence which was measured by ellipsometry are shown in Table 5. Visibly noticeable color and % transmittance measured by the TCS Plus Spectrophotometer after 7 days aging in a 120° C. oven are also shown in Table 5. Water absorption data obtained as described in the Test Method section above are shown in Table 6.

TABLE 5

| Example | Oligo. MW | Oligo/ HDDMA (%) | Tg (° C.) | Volume Shrinkage (%) | Birefringence | Sample Color after 120° C. aging for 7 days | % T at 420 nm after 120° C. aging for 7 days |
|---|---|---|---|---|---|---|---|
| 1 | 30K | 75/25 | — | — | $2.59 \times 10^{-7}$ | None | 87.3 |
| 2 | 18K | 80/20 | — | — | $1.51 \times 10^{-7}$ | None | 89.3 |
| 3 | 9.0K | 80/20 | 109 | 2.8 | $5.07 \times 10^{-7}$ | — | — |
| 4 | 3.0K | 90/10 | — | 2.1 | $1.32 \times 10^{-7}$ | — | — |
| 5 | 3.2K | 90/10 | 88 | 2.4 | $4.03 \times 10^{-7}$ | — | — |
| 6 | 1.4K | 90/10 | — | — | $6.33 \times 10^{-7}$ | — | — |
| 7 | 9.0K | 90/10 | 94 | 0.9 | $1.82 \times 10^{-7}$ | None | 89.9 |
| 8 | 9.0K | 80/20 | 100 | 2.7 | $1.47 \times 10^{-7}$ | None | 90.2 |
| 9 | 9.0K | 70/30 | 94 | 4.7 | $4.39 \times 10^{-7}$ | None | 90.1 |
| C1 | 9.0K | 60/40 | 79 | 5.5 | $1.24 \times 10^{-6}$ | None | 89.4 |
| 10 | 9.0K | 80/20 | — | — | — | None | 91.3 |
| 11 | 6.5K | 85/15 | — | — | — | None | 90.5 |
| C2 | — | — | 53 | — | — | Yellow | 81.0 |
| C3 | 1.2K | — | 97 | 6.8 | $3.88 \times 10^{-6}$ | Yellow | 74.3 (3 days) |

TABLE 5-continued

| Example | Oligo. MW | Oligo/HDDMA (%) | Tg (° C.) | Volume Shrinkage (%) | Birefringence | Sample Color after 120° C. aging for 7 days | % T at 420 nm after 120° C. aging for 7 days |
|---|---|---|---|---|---|---|---|
| C4 | — | — | 67 | — | $7.06 \times 10^{-5}$ | Yellow | 80.7 |
| C5 | — | — | 60 | — | $7.81 \times 10^{-6}$ | yellow | 82.8 |

TABLE 6

| Example | Water Absorption (14 days in 23° C. water) |
|---|---|
| 8 | 0.17% |
| 10 | 0.22% |
| C3 | 0.87% |

Example 12

In Example 12, IBOA, HEA, chain transfer agent IOTG, and the $1^{st}$ charge of thermal initiators Vazo 52 and 88, according to Table 7, were added to a flour neck flask equipped with a reflux condenser, thermometer, mechanical stirrer, and nitrogen gas inlet. The mixture was stirred and heated to 60° C. under nitrogen. The temperature of the reaction mixture peaked at around 180° C. during the polymerization. After the reaction peak, the batch was further polymerized at 140° C. for 30 minutes with the addition of the $2^{nd}$ initiator, Vazo 88, to reduce residual monomers and eliminate initiator. After that, the batch was cooled to 120° C. and the IBOA reactive diluent was added to the reactor to reduce viscosity of the batch. MAnh was then added to the batch to react with the hydroxyl groups on the oligomer chains to incorporate methacrylate groups. The reaction time was approximately 6 hours. The HDDMA was then added and the solution was cooled to ambient. The reactive oligomer syrups of Table 7 were formulated with 0.02 weight % Lucirin TPOL photoinitiator to make the curable material composition to prepare plastic prisms and PBS prisms.

TABLE 7

|  | Example 12 |
|---|---|
| IBOA (g) | 185 |
| HEA (g) | 15 |
| IOTG (g) | 8 |
| Vazo 52 (g)/ | 0.025/ |
| Vazo 88 (g) | 0.025 |
| Vazo 88 (g) | 0.050 |
| IBOA (g) | 10 |
| MAnh (g) | 21.18 |
| HDDMA (g) | 35.3 |
| Lucirin TPOL (g) | 0.055 |

Example 13

Preparation of a Plastic Prism

For Example 13 the prism mold described in FIG. 1 was used. Component 10a was made of stainless steel with component 15 being a glass plate, component 20 was not used and component 30 was a glass microscope slide. The volume 40a was filled with the formulated reactive oligomer syrup prepared in Example 12 and another glass plate was placed on top of filled volume 40a. The assembly was cured with a Xenon flash lamp at room temperature for 5 minutes.

Example 14

Preparation of a Plastic PBS Prism

For Example 14, the prism mold described in FIG. 1 was used. Component 10a was made of stainless steel with component 15 being a glass plate, component 20 was PBS Film and component 30 was a glass microscope slide. The volume 40a was filled with the formulated reactive oligomer syrup prepared in Example 12 and another glass plate was placed on top of filled volume 40a. The assembly was cured with a Xenon flash lamp at room temperature for 5 minutes. The glass slide was removed and a plastic prism such as prepared in Example 13 was attached to the PBS Film surface with an Optical Adhesive to generate a PBS prism.

Example 15

Preparation of a Plastic PBS Prism

For Example 15, the prism molds described in FIG. 1 were used. Component 10a was made of stainless steel with component 15 being a glass plate, component 20 was PBS film and component 30 was a glass microscope slide. The volume 40a was filled with the formulated reactive oligomer syrup prepared in Example 12 and another glass plate was placed on top of filled volume 40a. The assembly was cured with a Xenon flash lamp at room temperature for 5 minutes. The component 30 was then removed and a second mold 10b was placed adjacent to the PBS Film surface of the cured mold. The volume 40b was filled with the formulated reactive oligomer syrup prepared in Example 12 and a glass plate was placed on top of filled volume 40b. The assembly was cured with a Xenon flash lamp at room temperature for 5 minutes.

Example 16

Preparation of a Plastic PBS Prism

For Example 16, the prism molds described in FIG. 2 were used. Components 110a and 110b were made of stainless steel with component 115 being a glass plate, component 120 was PBS Film film. The volumes on either side of 120, 140a and 140b, were filled with the formulated reactive oligomer syrup prepared in Example 12 and another glass plate was placed on top of the filled volumes. The assembly was cured with a Xenon flash lamp at room temperature for 5 minutes.

Preparative Examples 17-22

In Preparative Examples 17-22, IBOA, HBA, chain transfer agent (IOTG, PETMP, or TMPTMP), and thermal initiators (Vazo 52, Vazo 88, Luperox 130XL45) according to Table 1, were added to a four neck flask equipped with a reflux condenser, thermometer, mechanical stirrer, and nitrogen gas inlet. The mixture was stirred and heated to 60° C. under nitrogen. The temperature of the reaction mixture peaked at around 180° C. during the polymerization. After the reaction peak, the mixture was further heated at 140° C. for 30 minutes. A sample (1 g) was taken at the end of this reaction period for molecular weight determination by SEC. The temperature of the mixture was cooled to 120° C. and MAnh and Irganox 1076 were added. The reaction mixture was stirred for 4 hours at 120° C. to give the oligomer mixture as a thick liquid.

piece of approximately 15 cm by 15 cm of 51 micrometers A31 release liner was place on top of the filled mold, 5) another Pyrex glass plate approximately 15 cm by 15 cm by 0.5 cm was placed on top of the release liner, and 6) finally, the filled mold was placed into an 80° C. oven and allowed to equilibrate for 15 minutes. The assembly was then cured using a Norlux 808 375 nm LED array (NAR375808A003 available from Norlux Corporation, Carol Stream, Ill.) with an exposure time of 1 minute. After curing, the compositions were cooled to room temperature, then released from the mold.

The fracture toughness and $T_g$ of the cured compositions are presented in Table 9.

TABLE 9

| Example | Preparative Example | Preparative Example HDDMA (pph) | T-acrylate (pph) | Bisomer EP100 DMA (pph) | $K_{Ic}$ (MPa m$^{1/2}$) | Tg (° C.) | Shrinkage | Color (7 Days, 120° C.) | Transmittance (420 nm, 7 days 120° C.) |
|---|---|---|---|---|---|---|---|---|---|
| 23 | 17 | 80 | 10 | 10 | 0.381 | 104 | | | |
| 24 | 18 | 80 | 10 | 10 | 0.316 | 93 | | | |
| 25 | 20 | 80 | 10 | 10 | 0.411 | 109 | 5.0% | None | 88.5% |
| 26 | 17 | 80 | 10 | 10 | | 0.432 | 101 | | |
| 27 | 22 | 80 | 10 | 10 | | 0.432 | 128 | | |
| 28 | 20 | 90 | | 10 | | 0.371 | 114 | 1.7% | None | 88.2% |
| 29 | 18 | 85 | | | 15 | 0.265 | 81 | | None | 88.8% |
| 30 | 17 | 85 | | | 15 | 0.209 | 90 | | | |
| 31 | 19 | 85 | | | 15 | 0.414 | 86 | | | |
| 32 | 19 | 85 | | | 15 | 0.416 | 90 | | | |

TABLE 8

| | Preparative Example | | | | | |
|---|---|---|---|---|---|---|
| | 1 | 18 | 19 | 20 | 21 | 22 |
| IBOA (g) | 180.0 | 360.0 | 180.0 | 360.0 | 180 | 360.0 |
| HBA (g) | 20.0 | 40.0 | 20.0 | 40.0 | 20 | 40.0 |
| IOTG (g) | 4.0 | 20.0 | | | | |
| PETMP (g) | | | | 12.0 | 6.0 | 20.0 |
| TMPTMP (g) | | | 6.5 | | | |
| Vazo 52 (g) | 0.01 | 0.02 | 0.01 | 0.02 | 0.01 | 0.02 |
| Vazo 88 (g) | 0.01 | 0.02 | 0.01 | 0.02 | 0.01 | 0.02 |
| Luperox 130XL45 (g) | 0.01 | 0.02 | 0.01 | 0.02 | 0.01 | 0.02 |
| MAnh (g) | 22.8 | 45.6 | 22.8 | 45.6 | 22.8 | 45.6 |
| Irganox 1076 (g) | 0.42 | 0.42 | 0.41 | | 0.41 | 0.82 |
| Mw (g/mol) | 8700 | 4100 | 7900 | 10000 | 8900 | 9500 |

Preparation of Test Samples

Curable compositions were prepared by preheating a blend of the oligomer mixtures described in Preparative Examples 17-22, crosslinker(s) (HDDMA, T-acrylate, or Bisomer EP100DMA), and 0.06 wt % Lucirin TPO-L at 80° C. followed by mixing in a white disposable cup using a DAC-100 mixer (both cup and mixer are available from Flack Tek Inc., Landrum, N.J.). The compositions were degassed in a vacuum chamber. The formulation amounts are presented in Table 2.

Curing of the compositions was carried out by the following steps: 1) on to a Pyrex glass plate approximately 15 cm by 15 cm by 0.5 cm was placed an approximately 15 cm by 15 cm piece of 51 micrometers A31 release liner, 2) on top of the release liner was placed an approximate same size glass mold with a 4.7 cm diameter opening at the center. 3) then the mold was filled with the curable composition, 4) then a second The data in Table 9 shows that the use of a multifunctional chain transfer agent for the preparation of the oligomer results in increased fracture toughness of the final cured composition. The cured composition derived from an oligomer with a multifunctional CTA and T-acrylate exhibits the highest Tg and fracture toughness.

The invention claimed is:

1. A curable composition comprising:
    a) 50 to 99 parts by weight of a (meth)acryloyl oligomer having a plurality of pendent, free-radically polymerizable functional groups and a $T_g$ of $\geq 20°$ C.;
    b) 1 to 50 parts by weight of a free-radically polymerizable crosslinking agent and/or a diluent monomer, and
    c) 0.001 to 5 parts by weight of a photoinitiator, based on 100 parts by weight of a) and b)
    wherein said oligomer comprises of polymerized monomer units comprising:
    a. 50 to 99 parts by weight of (meth)acrylate esters monomer units homopolymerizable to a polymer having a glass transition temperature $\geq 20°$ C.,
    b. 1 to 50 parts by weight of monomer units having a pendent, free-radically polymerizable functional group;
    c. less than 40 parts by weight of monomer units homopolymerizable to a polymer having a glass transition temperature $<20°$ C., based on 100 parts by weight of a) and b).

2. The curable composition of claim 1 comprising less than 25 parts by weight of said diluent monomer.

3. The curable composition of claim 1 comprising 1 to 40 parts by weight of said crosslinking agent.

4. The composition of claim 1 comprising 1 to 30 parts by weight of said crosslinking agent.

5. The composition of claim 1 further comprising 0.1 to 10 parts on units derived from a multifunctional chain transfer agent.

6. The composition of claim 1 wherein said (meth)acrylate esters are homopolymerizable to a polymer having a glass transition temperature $\geqq 50°$ C.

7. The composition of claim 1 comprising 60 to 97 parts by weight of said (meth)acrylate esters monomer units, and 3 to 40 parts by weight of monomer units having a pendent, free-radically polymerizable functional group.

8. The composition of claim 1 wherein said monomer units having a pendent, free-radically polymerizable functional group are prepared by reacting monomer units having a pendent reactive functional group with a mono ethylenically unsaturated compound having a coreactive functional group.

9. The composition of claim 8 wherein said pendent reactive functional groups are selected from hydroxyl, secondary amino, oxazolinyl, oxazolonyl, acetyl acetonyl, carboxyl, isocyanato, epoxy, aziridinyl, acryloyl halide, and cyclic anhydride groups.

10. The composition of claim 1, wherein the degree of polymerization of said oligomer is controlled by a chain transfer agent.

11. The composition of claim 10 wherein the chain transfer agent is a multifunctional chain transfer agent.

12. The composition of claim 1 wherein said free-radically polymerizable crosslinking agent has a functionality of at least 2, and is of the formula R-$(Z)_n$, where Z comprises a free-radically polymerizable functional group such as a carbon-carbon double bond, n is greater than 1 and R is an organic radical having a valency of n.

13. The composition of claim 12 wherein the crosslinking agent is selected from di(meth)acrylic acid esters and the bisallyl ethers of bis(hydroxymethyl)-tricyclo-decane.

14. The composition of claim 1 wherein the sum of said crosslinking agent and said diluent monomer is less than 40 parts by weight.

15. The composition of claim 1 wherein said oligomer is prepared by an adiabatic polymerization process.

16. The cured composition of claim 1.

17. A shaped article comprising the cured composition of claim 1.

18. An optical coating comprising the cured composition of claim 1.

* * * * *

UNITED STATES PATENT AND TRADEMARK OFFICE
CERTIFICATE OF CORRECTION

PATENT NO.        : 7,767,728 B2                                    Page 1 of 1
APPLICATION NO.   : 12/279236
DATED             : August 3, 2010
INVENTOR(S)       : Ying-Yuh Lu It is certified that error appears in the above-identified patent and that said Letters Patent is hereby corrected as shown below:

Column 7,
Line 27, delete "gellation" and insert -- gelation --.
Line 37, delete "gellation." and insert -- gelation. --.

Column 9,
Line 48, delete "processable." and insert -- processible. --.

Column 10,
Line 19, after "such as" delete "a,".

Column 12,
Line 47, after "laser" insert -- . --.

Column 14,
Line 16, delete "melt-processable," and insert -- melt-processible, --.

Column 15,
Line 61, delete "polarizing-layer)," and insert -- polarizing layer), --.

Column 27,
Line 26, delete "flour" and insert -- four --.

Column 31,
Line 16, delete "acryloyl" and insert -- acyloyl --.

Column 32,
Line 9, delete "tricyclo-decane." and insert -- tricyclo[5.2.1.0$^{2.6}$]-decane. --.

Signed and Sealed this

Twelfth Day of October, 2010

David J. Kappos
*Director of the United States Patent and Trademark Office*